United States Patent
Tiwari et al.

(10) Patent No.: US 9,156,344 B2
(45) Date of Patent: Oct. 13, 2015

(54) MOTOR-ASSISTED TRANSMISSION

(75) Inventors: Awadesh Tiwari, Bangalore (IN); Ravikanth G V, Karnataka (IN); Atul Kumar Agrawal, Karnataka (IN); Madhukar Kumar, Bihar (IN); Vikas Bhu Sharma, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 659 days.

(21) Appl. No.: 12/966,369

(22) Filed: Dec. 13, 2010

(65) Prior Publication Data

US 2012/0149514 A1    Jun. 14, 2012

(51) Int. Cl.
*F16H 3/72* (2006.01)
*B60K 6/48* (2007.10)
*B60K 6/38* (2007.10)

(52) U.S. Cl.
CPC *B60K 6/48* (2013.01); *F16H 3/725* (2013.01); *B60K 2006/381* (2013.01); *B60K 2006/4816* (2013.01); *F16H 2200/0034* (2013.01); *F16H 2200/2005* (2013.01); *Y02T 10/6221* (2013.01); *Y02T 10/6256* (2013.01)

(58) Field of Classification Search
CPC .................. B60K 2006/381; B60K 2006/4816
USPC .......... 475/5, 302, 207; 74/329, 339; 903/911
See application file for complete search history.

(56) References Cited

U.S. PATENT DOCUMENTS

| | | | | |
|---|---|---|---|---|
| 6,159,127 A * | 12/2000 | Loeffler et al. | | 477/5 |
| 6,394,924 B1 * | 5/2002 | Schiebold et al. | | 475/5 |
| 6,428,438 B1 * | 8/2002 | Bowen | | 475/5 |
| 6,634,986 B2 * | 10/2003 | Kima | | 477/107 |
| 6,645,105 B2 * | 11/2003 | Kima | | 475/5 |
| 6,719,655 B2 * | 4/2004 | Kramer | | 475/5 |
| 6,948,394 B2 * | 9/2005 | Ikeda | | 74/331 |
| 8,075,436 B2 * | 12/2011 | Bachmann | | 475/5 |
| 2009/0011887 A1 * | 1/2009 | Komada et al. | | 475/5 |
| 2010/0197436 A1 * | 8/2010 | Ideshio et al. | | 475/8 |
| 2010/0216584 A1 * | 8/2010 | Lutoslawski | | 475/5 |
| 2012/0129638 A1 * | 5/2012 | Kaltenbach et al. | | 475/5 |

\* cited by examiner

*Primary Examiner* — Terry Chau
(74) *Attorney, Agent, or Firm* — Quinn Law Group, PLLC

(57) ABSTRACT

A powertrain has an engine with a crankshaft. The powertrain includes a planetary gear set having a first, a second, and a third member. The first member is connected for common rotation with an input member. A first clutch is selectively engageable to operatively connect the crankshaft with the input member. A second clutch is selectively engageable to ground the input member with a stationary member. An electric motor/generator has a rotor operatively connected for common rotation with the second member. An output member is provided, with a set of intermeshing gears configured to transfer torque from the third member to the output member. A first gear pair and a second gear pair are operable by engagement of a first synchronizer and a second synchronizer, respectively, to provide two different fixed ratios between the input member and the output member.

11 Claims, 1 Drawing Sheet

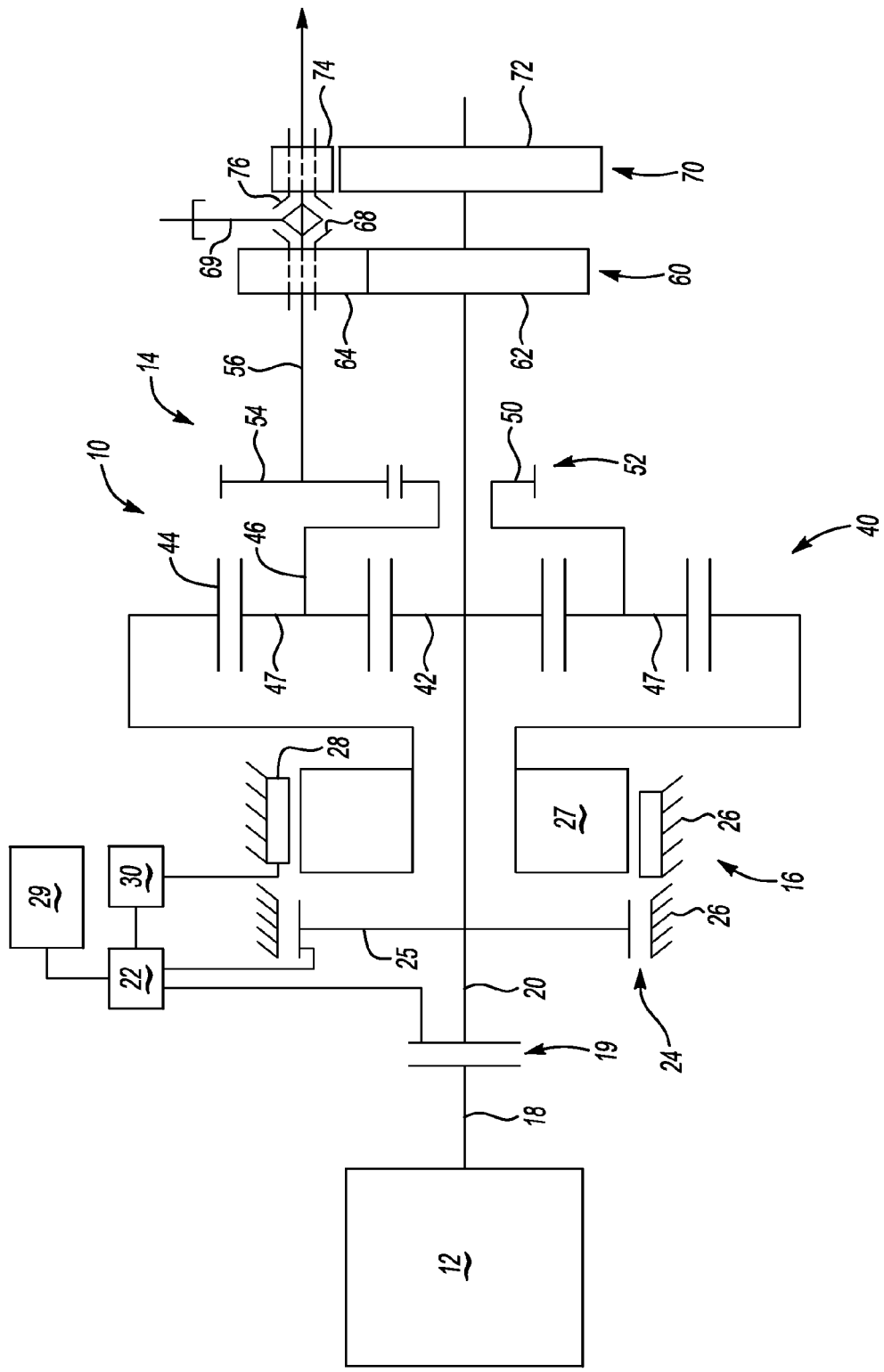

MOTOR-ASSISTED TRANSMISSION

TECHNICAL FIELD

The invention relates to a powertrain with a manual transmission and having a motor/generator.

BACKGROUND

Conventional manual transmissions utilize a driver-operated clutch and a stick shift that is manually shifted by the driver. The clutch is disengaged when the shift fork moves a synchronizer to engage different gears that establish different fixed speed ratios (i.e., different gear ratios) through the transmission. In lower gear ratios, drivers often expect greater torque or speed than the transmission is designed to provide. This causes the driver to depress the accelerator pedal excessively during these gear ratios, decreasing fuel economy. Additionally, low gear ratios in manual transmissions are inherently noisy as the engine is operated at lower speeds during launch.

SUMMARY

A transmission is provided with a motor/generator operable to launch the transmission and to provide torque in tandem with an engine through a planetary gear set to allow the engine to operate at an optimal predetermined speed during relatively low output speed ranges. The transmission is operable at different fixed ratios at higher output speeds to provide superior fuel economy at high speeds, such as during highway cruising.

Specifically, a powertrain is provided with an engine having an engine crankshaft. The powertrain includes a planetary gear set having a first member, a second member, and a third member, which members include a sun gear member, a carrier member, and a ring gear member. The first member is connected for common rotation with an input member. A first clutch is selectively engageable to operatively connect the engine crankshaft with the input member. A second clutch is selectively engageable to ground the input member with a stationary member. As used herein, a stationary member is a nonrotating member, such as a transmission housing. An electric motor/generator having a rotor operatively connected for common rotation with the second member. An output member is provided, with a set of intermeshing gears configured to transfer torque from the third member to the output member. A first gear pair has a first gear connected for rotation with the input member and a second gear meshing with the first gear and rotatable about the output member. A second gear pair has a third gear connected for rotation with the input member and a fourth gear meshing with the third gear and rotatable about the output member. A first synchronizer is selectively engageable to connect the second gear for common rotation with the output member. A second synchronizer is selectively engageable to connect the fourth gear for common rotation with the output member.

By providing a single planetary gear set and an electric motor/generator, the speed ratios normally achieved in lower manual gears of a manual transmission are achieved in an electrically-variable operating mode that allows the engine to be operated at its most optimal operating point for fuel efficiency while the motor/generator provides additional torque. The powertrain provides the benefits and cruising comfort of a manual transmission in the fixed ratio operating modes, with optimal fuel economy at the lower output speeds.

The motor/generator is used without the engine to launch the vehicle, further improving fuel economy. The motor/generator may also be controlled to vary torque at the output member during shifts between the two fixed speed ratios, guarding against possible failures or slippage of the synchronizers. The motor/generator may also be controlled to dampen engine vibrations during the electrically-variable operating mode. The motor/generator can be controlled to act as a generator to convert mechanical energy into stored electrical energy, such as when a vehicle with the powertrain is going downhill in an electric-only operating mode The above features and advantages and other features and advantages of the present invention are readily apparent from the following detailed description of the best modes for carrying out the invention when taken in connection with the accompanying drawings.

BRIEF DESCRIPTION OF THE DRAWINGS

The drawing is a schematic illustration of one embodiment of a powertrain.

DETAILED DESCRIPTION

Referring to the drawing, a powertrain 10 is shown that includes an engine 12 and a transmission 14. As further described below, the transmission 14 includes an electric motor/generator 16 that is used to provide additional torque to the powertrain 10 so that the engine 12 can be operated at its most efficient operating point over a range of output speeds typically associated with low fixed gears in a manual transmission.

The engine 12 has an engine crankshaft 18 that is selectively connectable via engagement of a first clutch 19 to provide torque to an input shaft 20, also referred to herein as an input member. Engagement of the first clutch 19 is maintained until selectively disengaged by a vehicle operator, typically by depressing a foot pedal or other operator input device to disconnect the engine crankshaft 18 from the input shaft 20, or by action of a controller 22 energizing an actuator (not shown) to engage the clutch 19 with hydraulic pressure.

The controller 22 also controls engagement of a second clutch 24 that is selectively engageable to connect a hub 25 of the input shaft 20 to a stationary member 26 therefore grounding the input shaft 20 to the stationary member 26. Second clutch 24 may be an electromagnetic clutch that engages when an electric current is applied to create a magnetic field.

The motor/generator 16 includes a rotor 27 and a stator 28. The stator 28 is mounted to the stationary member 26. The controller 22 provides electrical energy stored in an energy storage device 29, such as a battery, to the stator 28 through a power inverter 30 that converts stored direct current to alternating current used by the motor/generator 16. When the motor/generator 16 is operated as a motor, power is provided to the stator 28 to cause mechanical torque at the rotor 27 and rotation of the rotor 27. The rotor 27 rotates about an axis of rotation coaxial with the input shaft 20. When the motor/generator 16 is operated as a generator, mechanical torque of the rotor 27 is converted into electrical power in the stator 28 that is converted through the power invertor 20 and stored in the energy storage device 29.

The transmission 14 also has a planetary gear set 40 with a sun gear member 42, a ring gear member 44, and a carrier member 46. Pinion gears 47 supported by the carrier member 46 mesh with the ring gear member 44 and with the sun gear member 42. The sun gear member 42 is referred to as the first member, the ring gear member 44 is referred to as the second member, and the carrier member 46 is referred to as the third member. The sun gear member 42 is connected for common rotation with the input member 20. The ring gear member 44 is connected for common rotation with the rotor 27. The carrier member 46 is connected for rotation with a first transfer gear 50 of a transfer gear set 52, also referred to as a set of intermeshing gears. The transfer gear set 52 includes a second transfer gear 54 that meshes with the first transfer gear 50. The second transfer gear 54 is connected for common rotation with an output shaft 56, also referred to as an output member. The output shaft 56 is generally parallel with the input shaft 20.

A first gear pair 60 and a second gear pair 70 may be used to transfer torque from the input shaft 20 to the output shaft 56 at different speed ratios. The first gear pair 60 includes a first gear 62 connected for common rotation with the input shaft 20 and meshing with a second gear 64 that is rotatable about but not connected for rotation with the output shaft 56. The gears 62, 64 may be spur gears or other types of intermeshing gears. A first synchronizer 68 is engaged when a hydraulically actuated shift fork 69 (hydraulically controlled by controller 22) is moved to the left in the drawing to engage the second gear 64 for common rotation with the output shaft 56.

The second gear pair 70 includes a third gear 72 connected for common rotation with the input shaft 20 and meshing with a fourth gear 74 that is rotatable about but not connected for rotation with the output shaft 56. The gears 72, 74 may be spur gears or other types of intermeshing gears. A second synchronizer 76 is engaged when the shift fork 69 is moved to the right in the drawing to engage the fourth gear 74 for common rotation with the output shaft 56. The first synchronizer 68 and the second synchronizer 76 are adjacent one another on the output shaft 56 and may be made integral as a dual synchronizer, as shown. When the first synchronizer 68 is engaged, torque can be transferred from the input shaft 20 to the output shaft 56 by a speed ratio dependent on the tooth ratio of the first gear 62 to the second gear 64. When the second synchronizer 76 is engaged, torque can be transferred from the input shaft 20 to the output shaft 56 at a speed ratio dependent on the tooth ratio of the third gear 72 to the fourth gear 74.

In order to launch the transmission 14, an electric-only operating mode is established by engaging clutch 24 while clutch 19 and synchronizers 68 and 76 are not engaged. The engaged clutch 24 allows reaction torque to be provided by the stationary member 26 at the sun gear member 42. The engine 12 is off because fuel supply is cut off. The motor/generator 16 is controlled to operate as a motor to provide torque through the planetary gear set 40 and the transfer gear set 52 to the output shaft 56 to propel the vehicle. In addition to launching the vehicle in a forward direction, the motor/generator 16 may be controlled so that the rotor 27 rotates in an opposite direction of rotation to turn the output shaft 56 in a reverse direction of rotation, providing a reverse operating mode. The reverse operating mode is also an electric-only operating mode, and allows for one less set of intermeshing gears and one less synchronizer than would be needed to transfer torque from the input shaft 20 to the output shaft 56 in a reverse direction of rotation if the reverse mode were powered by the engine 12.

The electric-only mode is used to launch the vehicle and at relatively low vehicle speeds, for example, from 0-10 kilometers per hour. The launch is an improvement over launch using the engine in a conventional transmission, as the motor/generator 16 can provide the quick acceleration that is expected by the vehicle operator, without fuel economy losses associated with excessive depression of the accelerator throttle during launch. In the electric-only operating mode, the motor/generator 16 can be controlled to function as a generator when a vehicle with the powertrain 10 is going downhill to convert mechanical energy into stored electrical energy.

Once a threshold speed is established after launch, such as a speed of 10 kilometers per hour, clutch 24 is disengaged and clutch 19 engaged so that the engine 12 provides torque in parallel with the motor/generator 16 in an electrically-variable operating mode. In the electrically-variable operating mode, the engine 12 is controlled to operate at a predetermined optimal brake specific fuel consumption (BSFC) point, providing a predetermined torque or speed to the crankshaft 18 and input shaft 20. The motor/generator 16 is controlled to operate as a motor and alternately as a generator during this mode as operating conditions require in order to provide the operator-commanded torque at the output shaft 56 while allowing the engine 12 to operate at the predetermined speed for optimal fuel economy. The motor/generator 16 can be controlled to electrically damp vibrations of the engine 12 that may occur during low revolutions per minute (RPMs). Sensors (not shown) that indicate excessive vibrations are occurring at the crankshaft 18 control the motor/generator 16 to act as a motor or as a generator as necessary to cancel the torque variations associated with the vibrations. Because additional torque is provided by the motor/generator 16, the engine 12 may be down-sized from what would otherwise be required to meet demanded torque at the output shaft 56.

The electrically-variable operating mode is used until sensors (such as on the accelerator) indicate that the vehicle operator desires a speed at the output shaft 56 that is a relatively high speed with low torque required. The controller 22 then controls valves that route hydraulic fluid to move the shift fork 69 to the left to engage synchronizer 68, allowing torque to be transferred from the input shaft 20 to the output shaft 56. At the same time, the controller 22 ceases power from the battery 29 to the motor/generator 16, allowing the rotor 27 to freewheel. The engine 12 now provides torque at the output shaft 56 in a fixed ratio operating mode with a speed ratio determined by the tooth ratio of the first gear 62 to the second gear 64. When speed demanded at the output shaft 56 is even greater, the controller 22 will cause hydraulic fluid to actuate the shift fork 69 to the right, engaging the synchronizer 76 and establishing a higher fixed speed ratio determined by the tooth ratio of the third gear 72 to the fourth gear 74. The two fixed ratio operating modes are designed to provide speed ratios generally equivalent to a fourth gear and a fifth gear in a conventional manual transmission. The fuel economy and comfort provided by operating at fixed ratios at these higher speeds is thus not compromised with the motor-assisted transmission 14. The motor/generator 16 may provide torque when shifting between the fixed ratio operating modes to guard against slipping or failure of either of the synchronizers 68, 76.

During the electrically-variable operating mode or during either of the fixed ratio operating modes, if the vehicle requires braking or is traveling downhill, the controller 22 may operate the motor/generator 16 as a generator to convert some of the torque at the output shaft 56 into electrical energy stored in the energy storage device 29, slowing the output shaft 56 and capturing braking energy.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
an engine;
a layshaft transmission having an input shaft and an output shaft;
an electric motor/generator;
a transfer gear set having a first transfer gear and a second transfer gear meshing with the first transfer gear and mounted for rotation with the output shaft; wherein the transfer gear set is configured so that the second transfer gear rotates slower than the first transfer gear;
a planetary gear set having a first member fixed to the input shaft for rotation at a common speed with the input shaft, a second member fixed to the motor/generator for rotation at a common speed with the motor/generator, and a third member fixed to the first transfer gear for rotation at a common speed with the first transfer gear;
a first clutch selectively engageable to directly connect the engine for rotation with the input shaft so that the engine is fixed to the input shaft for rotation at a common speed with the input shaft;
a second clutch selectively engageable to ground the input shaft to a stationary member;
first and second gear pairs each operable for transferring torque from the input shaft to the output shaft at a respective fixed speed ratio by selectively engageable synchronizers when the first clutch is engaged, the engine is on and the motor/generator is not powered; wherein each of the first and the second gear pairs are configured to increase the speed of the output shaft relative to the speed of the input shaft; and
the powertrain being operable in an electrically-variable operating mode in which the motor is controlled to add torque to the output shaft through the planetary gear set while the first clutch is engaged and the engine is operated at a predetermined speed, the fixed speed ratios providing speeds of the output shaft greater than speeds of the output shaft in the electrically-variable operating mode.

2. A powertrain comprising:
an engine having an engine crankshaft;
a planetary gear set having a first member, a second member, and a third member, the members including a sun gear member, a carrier member, and a ring gear member;
an input member; wherein the first member is fixed to the input member for rotation at a common speed with the input member;
a first clutch selectively engageable to directly connect the engine crankshaft with the input member so that the engine crankshaft is fixed to the input member for rotation at a common speed with the input member, and the first member and the third member of the planetary gear set rotate at different speeds when the first clutch is engaged; wherein the engine is completely disconnected from the planetary gear set when the first clutch is not engaged;
a second clutch selectively engageable to ground the input member with a stationary member;
an electric motor/generator having a rotor continuously fixed to the second member for rotation at a common speed with the second member;
an output member;
a set of intermeshing gears including a first transfer gear continuously fixed to the third member for rotation at a common speed with the third member; wherein the set of intermeshing gears is configured to increase torque from the third member to the output member;
a first gear pair having a first gear continuously fixed to the input member for rotation at a common speed with the input member, and having a second gear meshing with the first gear and rotatable about the output member; wherein the first gear pair is configured to reduce torque from the input member to the output member;
a second gear pair having a third gear connected for rotation with the input member and a fourth gear meshing with the third gear and rotatable about the output member; wherein the second gear pair is configured to reduce torque from the input member to the output member;
a first synchronizer selectively engageable to connect the second gear for common rotation with the output member;
a second synchronizer selectively engageable to connect the fourth gear for common rotation with the output member;
wherein the first clutch is engaged, the second clutch is not engaged, the motor is not powered, and the synchronizers are alternately engaged to provide two different fixed speed ratios between the input member and the output member;
wherein the transmission is operable in an electrically-variable operating mode when the first clutch is engaged, the engine is on, and the motor/generator provides torque to the second member; and
wherein the electrically-variable operating mode is established to provide speeds of the output member greater than speeds of the output member during launch of the transmission and less than speeds of the output member during the two different fixed speed ratios.

3. The powertrain of claim 2, wherein the transmission is operable in an electric-only operating mode when the second clutch is engaged and the motor/generator is operated as a motor to provide torque to the output member.

4. The powertrain of claim 2, wherein the transmission is operable at a first of the two different fixed speed ratios when the first clutch is engaged, the engine is on, the motor/generator is off, and the first synchronizer is engaged, and is operable at a second of the two different fixed speed ratios when the first clutch is engaged, the engine is on, the motor/generator is off, and the second synchronizer is engaged.

5. The powertrain of claim 2, wherein the first member is the sun gear member, the second member is the ring gear member, and the third member is the carrier member.

6. The powertrain of claim 2, wherein the motor/generator is operated as a generator to receive torque from the second member and thereby slow the output member in a regenerative braking mode.

7. The powertrain of claim 2, wherein the motor/generator is operated as a motor to provide torque to the second member, the second clutch is engaged, and the first clutch and the synchronizers are not engaged to launch the transmission.

8. The powertrain of claim 7, wherein the engine provides a predetermined amount of torque at the crankshaft and the motor/generator is controlled to provide a varying amount of torque to meet varying output torque requirements at the output member in the electrically-variable operating mode.

9. The powertrain of claim 8, wherein the motor/generator is controlled to provide torque or receive torque as necessary to dampen engine vibrations.

10. The powertrain of claim 2, wherein the motor/generator is controlled to vary torque at the output member during a shift between the fixed speed ratios.

11. A powertrain comprising:
an engine having an engine crankshaft;
a transmission having:

a planetary gear set having a sun gear member, a carrier member, and a ring gear member;

an input shaft; wherein the sun gear member is fixed to the input shaft for rotation at a common speed with the input shaft;

a first clutch selectively engageable to directly connect the engine crankshaft with the input shaft so that the engine crankshaft is fixed to the input shaft for rotation at a common speed with the input shaft;

a second clutch selectively engageable to ground the input shaft with a stationary member;

an electric motor/generator having a rotor fixed to the ring gear member for rotation at a common speed with the ring gear member;

an output shaft generally parallel with the input shaft;

a set of intermeshing gears configured to increase torque from the carrier member to the output shaft;

a first gear pair having a first gear connected for rotation with the input shaft and a second gear meshing with the first gear and rotatable about the output shaft; wherein the first gear pair is configured to reduce torque from the input shaft to the output shaft;

a second gear pair having a third gear connected for rotation with the input shaft and a fourth gear meshing with the third gear and rotatable about the output shaft; wherein the second gear pair is configured to reduce torque from the input shaft to the output shaft;

a first synchronizer selectively engageable to connect the second gear for common rotation with the output shaft;

a second synchronizer selectively engageable to connect the fourth gear for common rotation with the output shaft; wherein the first synchronizer and the second synchronizer are arranged adjacent to one another and integrated as a dual synchronizer;

wherein the engine, the motor/generator, the clutches and the synchronizers are operable to provide a launch mode using torque provided by only the motor/generator, an electrically-variable mode using torque provided by both the engine and the motor/generator; and fixed ratio modes using torque provided by only the engine; and wherein the electrically-variable mode provides speeds of the output member less than speeds of the output member provided in the fixed ratio modes.

* * * * *